Sept. 19, 1961  G. L. WILSON  3,000,350
POULTRY DRINKING FOUNTAIN
Filed March 13, 1959
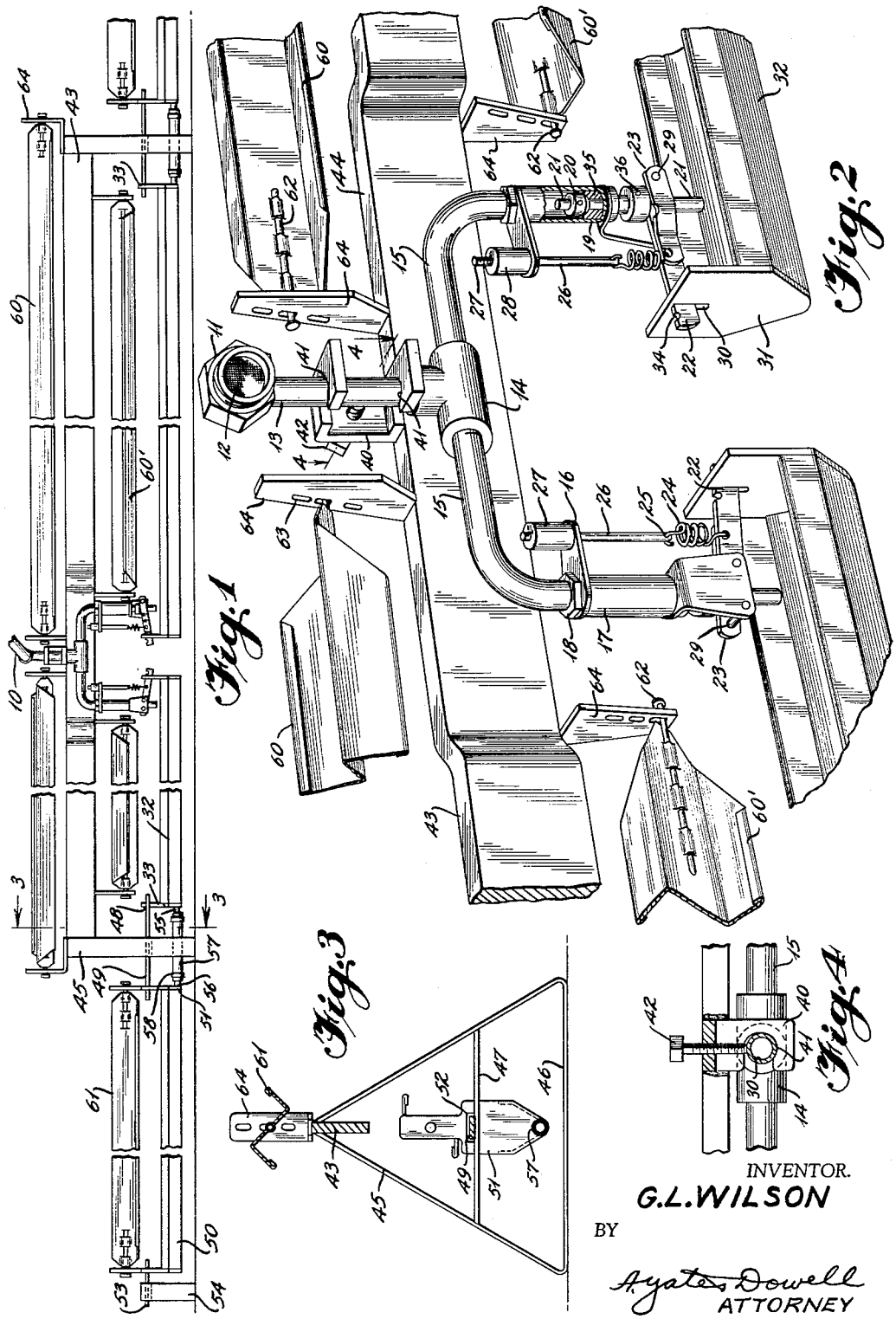
INVENTOR.
G.L.WILSON
BY
*A. Yates Dowell*
ATTORNEY

United States Patent Office 3,000,350
Patented Sept. 19, 1961

3,000,350
POULTRY DRINKING FOUNTAIN
Gurney L. Wilson, Rte. 1, Robbins, N.C.
Filed Mar. 13, 1959, Ser. No. 799,360
8 Claims. (Cl. 119—81)

This invention relates to the care and feeding of animal life of various kinds particularly domesticated, including poultry, and to apparatus or equipment by which a supply of water is maintained readily accessible at all times.

The invention relates to watering apparatus by which not only is a supply of water maintained at all times but in extended areas and the level of which is controlled from a remote location.

Watering devices of various kinds have been produced which have not been satisfactory because of their expensive and complicated construction, their unsatisfactory operation, the ease with which they are rendered inoperative, and their general inefficiency and unsatisfactory character.

It is an object of the invention to overcome the difficulties enumerated and to provide relatively simple and inexpensive watering apparatus by means of which water from a source of supply may be strained and rendered available at all times in a trough or container with the supply of water controlled by one or more valves to which one end of the trough or container is attached so that as the water accumulates the weight thereof will close the valve and shut off the flow, and with the lowering or reduction of the water in the trough or container, the valve or valves will be reopened to allow the supply to be replenished.

Another object of the invention is to provide a valve controlled water supply to one end of a generally horizontally disposed container, the control being in accordance with the raising and lowering of one end of the container in response to the amount of water therein while the other end of the trough remains at a substantially fixed level and with a connection from such end to another trough to increase the amount and area of availability of the water.

A further object of the invention is to provide apparatus of the character indicated including supporting frame structure on which one or more troughs or containers for water are mounted with one end of one trough vertically movable and with a valve controlled by such movement to determine the supply of water in associated troughs or containers.

Other objects and advantages of the invention will be apparent from the following description taken in conjunction with the accompanying drawings, wherein:

FIG. 1 is a front elevation illustrating one embodiment of the present invention;
FIG. 2, an enlarged fragmentary perspective of the water inlet control apparatus;
FIG. 3, a section on the line 3—3 of FIG. 1; and
FIG. 4, a section on the line 4—4 of FIG. 2.

Briefly stated, the invention comprises a supply pipe for application to a source of water supply and a control valve, by which the amount of water is adapted to be maintained in an elongated trough or container, one end portion of which is attached to and supported by the control valve and the other end being mounted on a fixed support so that the raising and lowering of one end of the valve determines the amount of water within the container and with such container connected to an additional fixed trough or container so that water is retained in the multiple containers by the operation of the valve.

With continued reference to the drawing, the device for supplying water includes a supply line 10 connected to a coupling 11 containing a strainer 12. A pipe 13 extends from the coupling 11 to a T-coupling 14 to which are connected a pair of elbows 15 having externally threaded depending ends, with such depending ends extending through an arm or bracket 16 to the internally threaded end of a valve housing 17, a lock nut 18 being provided to fasten the bracket 16 against the end of the valve housing.

The valve housing 17 has a valve seat 19 adapted to be engaged by a valve 20 to control the flow of water therethrough. The valve 20 is carried on a valve stem 21 fastened to an arm 22 by means of a clamping yoke 23, such yoke being fastened to the arm by means of a spring 24 having one end extending through an opening 25 in an adjustable supporting rod 26, the upper end of which is provided with external threads 27 which engage an adjustable sleeve 28. The clamping yoke 23 is attached to a pivot 29 so that it can oscillate thereon. The bar 22 extends through a slot 30 in the end 31 of a trough having sides 32 and a remote end 33. The end of the bar 22 is provided with notches 34 for relative adjustment between the bar and the end of the trough. When the trough is full of water, the weight of the water will cause the notched end of the bar 22 to be in its lower position so that the valve stem 21 will be at its lowest position, and the valve 20 will be in contact with its seat 19. When the water in the trough is reduced sufficiently the tension of spring 24 will cause the arm or bar 22 to swing upwardly and engage the limit collar 35 fastened to the valve stem by set screw 36 to open the valve 20 and fill the trough.

The supply pipe 13 which extends from the coupling 11 to the T-coupling 14 and parts suspended from it are mounted on a U-shaped bracket 40 having bayonet or hook type slots 41 in which the pipe 13 is received. A set screw 42 extends through the bracket 40 and bears against the pipe to maintain it in fixed position in such bayonet slots. The bracket 40 is mounted on a horizontal bar 43 having a central offset portion 44 to accommodate the T-coupling 14 and the elbows 15 so that they will be in the vertical plane of the ends of the bar 43 which ends are attached to the upper portion of triangular frames 45. Each frame has a base 46 and an intermediate brace or cross member 47 substantially parallel to the base. The remote end 33 of each trough 32 is provided with a slot 48 in which is received a flat bar 49 welded or otherwise secured to the intermediate horizontal brace 47. With the remote end of the trough mounted in this manner, the near end of the trough can readily move up and down to control the supply of water to the trough.

If desired, an additional trough 50 may be mounted beyond the triangular frame 45 on the flat bar 49 such trough having end members 51, each end member having a slot 52 in one of which the flat bar 49 is received and in the other a flat supporting bar 53 is received at the opposite end of the trough, such flat bar being mounted in a smaller A-frame 54. The troughs 32 and 50 are provided with projecting nipples 55 and 56 and a hose 57 secured by hose clamps 58 on such nipple. Thus the outer trough 50 is secured in fixed position while the trough 32 is substantially in fixed position except that it may rock on the end of the flat bar 49 as its opposite end moves up and down in accordance with the weight of the water in the trough. The water in the troughs 32 and 50 will be substantially the same and the upper level substantially horizontal when the troughs are filled. The water level will remain substantially constant in both troughs at all times. While two elbows 15 with associated pivoted troughs are disclosed in substantial longitudinal alignment, additional troughs may be employed, it being only necessary to have a source of water supply 15 for each.

In order to keep fowl from roosting above the troughs, guards 60 and 61 may be employed, such guards having central pivots 62 located in openings 63 in mounting brackets 64 attached to the bar 43 at the ends of the troughs. Beneath the bar 43 are similar brackets 64 in which similar guards 60' and 61' are mounted, thus reducing contamination of the water.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A water trough arrangement for use in the supplying of water to poultry and the like, comprising a suitable support, a first trough fixedly mounted on said support, a second trough having one end transversely and horizontally pivoted on said support, a flexible conduit interconnecting the said one end of the second trough to the first trough, water inlet means adjacent the other end of the second trough, and weight control valve means associated with said water inlet means and supporting the said other end of the second trough to control the flow of water thereto.

2. The structure of claim 1, in which said first trough is composed of multiple units.

3. the structure of claim 1, having anti-roost members over each of said troughs.

4. The structure of claim 1, in which said suitable support comprises at least one A frame.

5. The structure of claim 1, in which there are multiple trough arrangements supplied from a single water inlet means.

6. The structure of claim 1, in which there are multiple trough arrangements interconnected by a single water inlet source and with rotary anti-roost members over each of the troughs.

7. The structure of claim 1, in which there are two trough arrangements with movable contiguous trough ends, a bar having portions supported beyond the remote ends of the contiguous troughs, and with the water inlet means supported by said bar.

8. The structure of claim 1, the adjacent ends of the fixed and movable troughs being carried by a single support.

References Cited in the file of this patent

UNITED STATES PATENTS

| | | |
|---|---|---|
| 1,485,712 | Reynolds | Mar. 4, 1924 |
| 2,397,479 | Francis | Apr. 2, 1946 |
| 2,703,098 | Smallegan | Mar. 1, 1955 |
| 2,825,303 | Ashby | Mar. 4, 1958 |